United States Patent
Tran et al.

(10) Patent No.: US 7,099,902 B2
(45) Date of Patent: Aug. 29, 2006

(54) CHECKOUT AND REPLACE SCRIPT

(75) Inventors: LeVan T. Tran, Milpitas, CA (US);
Susan A. Charbonneau, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 617 days.

(21) Appl. No.: 10/318,880

(22) Filed: Dec. 13, 2002

(65) Prior Publication Data
US 2004/0117412 A1 Jun. 17, 2004

(51) Int. Cl.
*G06F 17/30* (2006.01)
(52) U.S. Cl. .................. 707/204; 707/10; 707/102; 707/103 R; 707/104.1; 707/101
(58) Field of Classification Search .............. 707/1, 707/2, 3, 100, 203, 10, 101, 102, 103 R, 707/104.1; 717/122; 709/226; 715/513, 715/531
See application file for complete search history.

(56) References Cited

U.S. PATENT DOCUMENTS

| | | | | |
|---|---|---|---|---|
| 4,809,170 A | * | 2/1989 | Leblang et al. | 717/122 |
| 5,167,017 A | * | 11/1992 | Sasaki | 715/531 |
| 5,278,979 A | * | 1/1994 | Foster et al. | 707/203 |
| 5,537,586 A | * | 7/1996 | Amram et al. | 707/3 |
| 5,574,898 A | * | 11/1996 | Leblang et al. | 707/1 |
| 5,649,200 A | * | 7/1997 | Leblang et al. | 717/122 |
| 5,860,071 A | * | 1/1999 | Ball et al. | 707/100 |
| 6,112,024 A | * | 8/2000 | Almond et al. | 717/122 |
| 6,834,276 B1 | * | 12/2004 | Jensen et al. | 707/2 |
| 6,880,008 B1 | * | 4/2005 | Yoneda | 709/226 |
| 6,892,204 B1 | * | 5/2005 | Haas et al. | 707/100 |
| 2003/0069877 A1 | * | 4/2003 | Grefenstette et al. | 707/2 |
| 2003/0237048 A1 | * | 12/2003 | Jones et al. | 715/513 |
| 2004/0205666 A1 | * | 10/2004 | Poynor | 715/531 |

OTHER PUBLICATIONS

Chan, "RCS HOWTO", 2001, pp. 1-4.*
Harvey Mudd, "RCS: the revision control system", HCM computer Science Department, 2001, pp. 1-6.*
"*Find and replace a string in every file in a sub directory*" p. 1 [online]. [Retrieved on Mar. 17, 2003]. Retrieved from the Internet:<URL:http://www.timestocome.com/webtools/find.html>. No author provided.
Chan, T. "*RCS: HOWTO*" pp. 1-4 [online]. [Retrieved on Mar. 17, 2003]. Retrieved from the Internet: <URL: http://rescomp.berkeley.edu/about/training/allres/RCS-HOWTO/RCS-HOWTO.pdf>.
"*RCS: The Revision Control System*" pp. 1-5 [online]. [Retrieved on Mar. 17, 2003]. Retrieved from the Internet: <URL: http://www.cs.hmc.edu/qref/rcs.html>. No author provided.

* cited by examiner

*Primary Examiner*—Thuy N. Pardo
(74) *Attorney, Agent, or Firm*—Gunnison, McKay & Hodgson, L.L.P.; Lisa A. Norris

(57) ABSTRACT

Designated files are automatically scanned for instances of a first string pattern. When a text file containing an instance of the first string pattern is found, each instance of the first string pattern in the text file is automatically replaced with a second string pattern and an annotation of the nature of the changes made to the file automatically created. This process is automatically repeated on the remainder of the designated files until complete. Inputting an empty string as the second string pattern effects deletion of instances of the first string pattern in a file.

19 Claims, 4 Drawing Sheets

CHECKOUT AND REPLACE SCRIPT

A Computer Program Listing Appendix on compact disc, in duplicate, are included in the application. The compact discs are included as Copy 1 and Copy 2, for a total of two compact discs. Disc Copy 1 includes the file "coAndReplace_ansi.txt", 7,215 bytes, created Oct. 11, 2002. Disc Copy 2 includes the file "coAndReplace_ansi.txt", 7,215 bytes, created Oct. 11, 2002.

The material on the compact discs Copy 1 and Copy 2 are hereby incorporated by reference.

BACKGROUND OF THE INVENTION

1. Field of the Invention

The present invention relates generally to editing of computerized files, and more particularly to editing of computerized text files.

2. Description of Related Art

Web sites are conventionally constructed of a plurality of individual web pages. Generally, each web page is constructed from a computerized file or files, such as graphic files and text files, that can be read by a computer system resulting in a display of data on a display screen. The computerized text files, also referred to herein as simply "files", can be written in different languages such as HyperText Markup Language (HTML), Java, and Practical Extraction and Reporting Language (PERL), as well as other coding languages suitable for implementation of a web site.

The maintenance of the text files that support the web pages of the web site is largely performed by web designers and technical writers. When changes need to be made to a web site, the individual text files affected by the changes first need to be located and then edited to effect the changes. In some instances, locating the affected text files may require a search of each text file to determine if it is affected. In larger web sites, which can be constructed of hundreds and thousands of text files, even a simple change, such as an organizational name change, can require a large amount of time to search for and edit each affected text file.

Typically, the editing process is largely a manual process. Basic editing functions are provided by some utilities and software products, but editing is performed on one file at a time. For example, the UNIX operating system provides, "grep" and "sed" commands and a VI text editor that permit string pattern replacement in an individual file. These commands are manually intensive as each file that includes the string pattern must first be located, for example, using a UNIX command "find". Then the file opened and each instance of the string pattern replaced, and then the file saved. Other operating systems typically provide commands and text editors that perform similar functions. Not only is the editing process time intensive, it is also unacceptably vulnerable to errors, such as missed edits or incorrectly entered changes by the user.

To control access and track changes made to the text files supporting the web site, many web designers and technical writers utilize a version control system. Generally, version control systems maintain an archive copy of a file, commonly termed a source file, and a history of changes made to the source file. In some version control systems, to modify a source file, the file must be checked-out from the version control system by a user. This typically results in the source file being locked to prevent more than one user at a time from modifying the source file. Checking-in the file to version control system registers the changes made to the source file and removes locks on the source file. Thus, while editing text files, a user can have to wait to obtain access to a file in order to make changes. Then after editing one file and checking-in the file so that the changes made to the file are registered in the version control system, a user would then have to manually search and edit (if applicable) the next file, repeating the process for all the text files supporting the web page that may be affected by the changes. This can be a time consuming process dependent on the availability of files and number of files.

Thus, it would be desirable to have a method that permits a user, such as a web designer or technical writer, to more quickly and efficiently edit text files, such as for a web site. Further, it would be desirable that the method permit multiple files to be scanned for a particular string pattern and automatically edited to replace a particular string pattern with a substitute string pattern, or to delete the particular string pattern. Also, it would be desirable that the method automatically annotate the changes made to the text file.

SUMMARY OF THE INVENTION

According to the principles of this invention, methods for quickly and efficiently editing text files are described. Designated files are automatically scanned for instances of a first string pattern. When a text file containing an instance of the first string pattern is found, each instance of the first string pattern in the text file is automatically replaced with a second string pattern and an annotation of the nature of the changes made to the file automatically created. This process is automatically repeated on the remainder of the designated files until complete. Inputting an empty string as the second string pattern effects deletion of instances of the first string pattern in a file.

In one embodiment, a method for editing computerized files includes: inputting a first string pattern, one or more instances of the first string pattern to be scanned for in one or more computerized files; inputting a second string pattern to be substituted in place of the one or more instances of the first string pattern; inputting one or more computerized files to be scanned for the one or more instances of the first string pattern; scanning the one or more computerized files for the one or more instances of the first string pattern; replacing each of the one or more instances of the first string pattern in the one or more computerized files with the second string pattern; and automatically creating an audit annotation of the nature of the replacements made to the computerized files.

In another embodiment, a method for editing computerized files includes: inputting a first string pattern, one or more instances of the first string pattern to be scanned for in one or more computerized files; inputting a second string pattern to be substituted in place of the one or more instances of the first string pattern; inputting one or more computerized files to be scanned for instances of the first string pattern; scanning the one or more computerized files for one or more instances of the first string pattern; determining if a computerized file contains one or more instances of the first string pattern; if a computerized file does not contain one or more instances of the first string pattern, determining if the computerized file is the last file to be scanned; if the computerized file is not the last file to be scanned, returning to scanning the remaining one or more computerized files for one or more instances of the first string pattern; if the computerized file is the last file to be scanned, the scanning of the files is complete, and ending the method; if the computerized file does contain one or more instances of the first string pattern, determining what version control system is utilized with the computerized file; determining if the computerized file is checked-out from the version control system; if the computerized file is checked-out from the version control system, archiving the computerized file by checking-in the computerized file to the version control system; if the computerized file is not checked-out from the version control system, checking-out the computerized file from the version control system; replacing one or more instances of the first string pattern in the computerized file with the second string pattern; checking in the computerized file including the replacements to the version control system; automatically annotating the nature of the changes made to the computerized file in the version control system; and returning to scanning the remaining one or more computerized files for one or more instances of the first string pattern.

In some embodiments, archiving the computerized file includes: saving a copy of the original contents of the computerized file as a renamed file; breaking the version control system lock on the computerized file; checking-out the computerized file from the version control system; saving the original contents in the version control system; determining if the version control system associated with the computerized file is a specified version control system; if the version control system is a specified version control system, returning to checking out the computerized file from the version control system; and if the version control system is not the specified version control system, checking in the computerized file using the specified version control system and renaming the file.

In further embodiments, computer program products including computer readable instructions for generating methods for editing computerized files are also described.

As a result of these and other features discussed in more detail below, methods and computer program products designed according to the principles of the present invention allow quicker and more efficient editing of text files when compared to the prior art techniques earlier described.

It is to be understood that both the foregoing general description and the following detailed description are intended only to exemplify and explain the invention as claimed.

BRIEF DESCRIPTION OF THE DRAWINGS

The accompanying drawings, which are incorporated in, and constitute a part of this specification, illustrate embodiments of the present invention, and together with the description, serve to explain the principles of the invention.

In the drawings.

DETAILED DESCRIPTION

The invention will now be described in reference to the accompanying drawings. The same reference numbers may be used throughout the drawings and the following description to refer to the same or like structures.

According to the present invention, one or more computerized files, such as text files, are automatically scanned for a first string pattern. The particular text files can be specifically designated by a user or by default. When one or more instances of the first string pattern are found in a text file, each instance of the first string pattern is automatically replaced with a substitute, second string pattern, and an annotation of the nature of the changes made to the file automatically created utilizing a version control system. The process is automatically repeated on the remainder of the designated text files until complete. Input of an empty string pattern as the second string pattern effects deletion of instances of the first string pattern.

If a text file is currently checked-out from a version control system, the present invention automatically breaks the version control system lock on the file, saves a copy of the current contents of the file and forces check-in of the text file to the version control system. The file is then automatically checked-out from the version control system to permit automatic replacement of instances of the first string pattern in the text file with the second string pattern. The edited text file is then automatically checked-in to the version control system, and an annotation of the nature of the changes made to the file automatically created.

It can be appreciated by those of skill in the art that although the present invention is described herein as implemented in PERL script programming language, the present invention can be written in other programming languages that can implement the various operations of the embodiments of the present invention.

Figure 1:
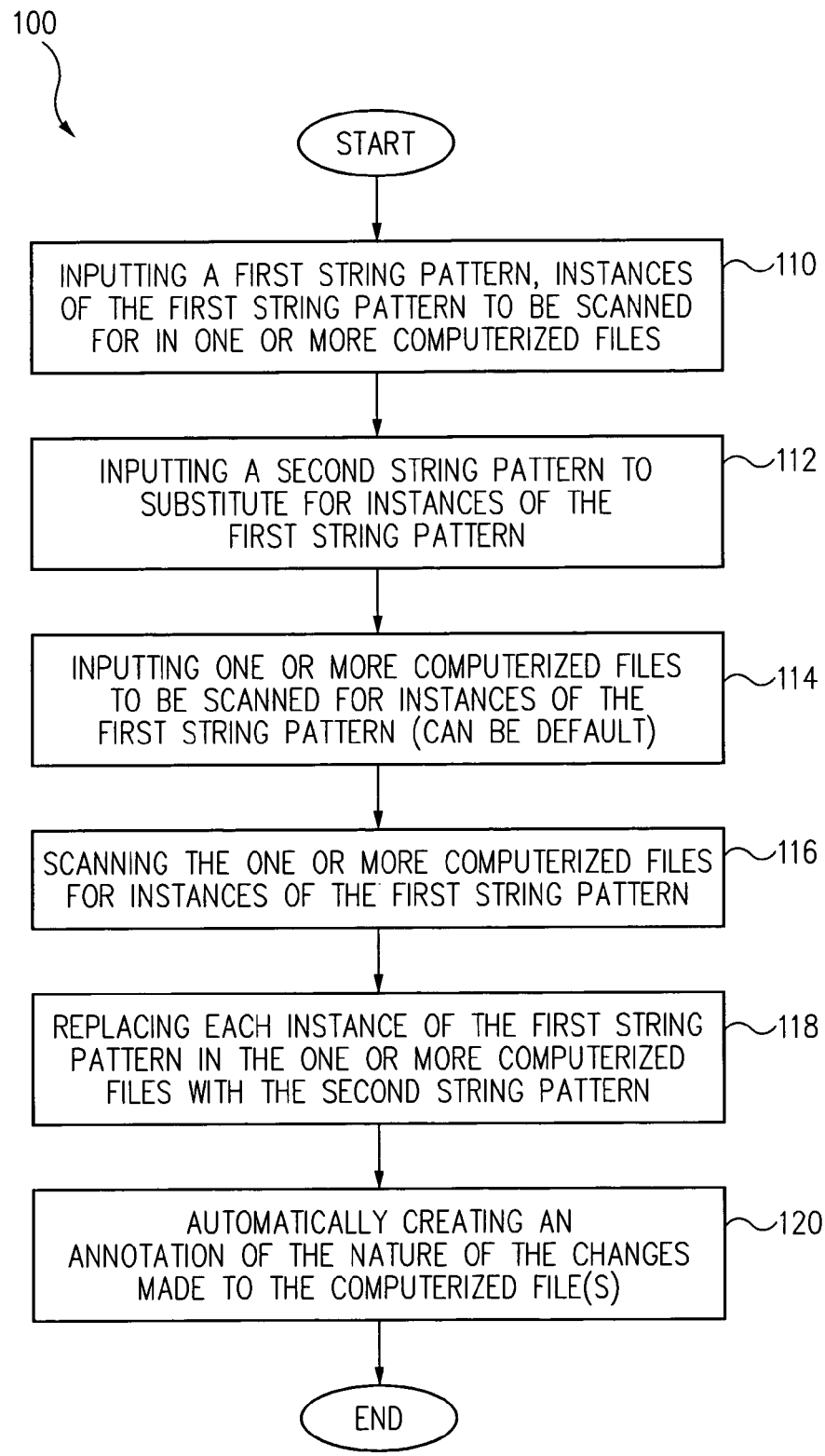
FIG. 1 illustrates a process flow diagram of a method for editing one or more computerized files containing one or more instances of a first string pattern in which each instance of the first string pattern is automatically replaced with a substitute, second string pattern and an annotation of the nature of the changes made automatically created according to one embodiment of the present invention.

FIG. 1 illustrates a process flow diagram of a method for editing one or more computerized files containing one or more instances of a first string pattern in which each instance of the first string pattern is automatically replaced with a substitute, second string pattern and an annotation of the nature of the changes made automatically created according to one embodiment of the present invention.

According to method 100, at operation 110, a user inputs a first string pattern to be scanned for in one or more computerized files, for example, text files. The first string pattern can define a specific instance of the first string pattern, or can define a set of instances of the first string pattern, such as by using a flexible notation. For example, a user can input a specific first string pattern that defines the specific instance "micrometer". Alternatively, a user can, for example, input a first string pattern that defines a set of instances of the first string pattern that begin with "micro", for example, micrometer, microwave, microelectronic, microscope, are example instances of the latter first string pattern. The set of instances of the first string pattern can be defined using flexible notation, such as a UNIX regex string pattern, or other flexible notation, such as the "*".

At operation 112, the user inputs a second string pattern to substitute in place of each instance of the first string pattern. The second string pattern defines a specific string, rather than a set of instances as described above with reference to the first string pattern. A user can simply delete the first string pattern by inputting an empty string as the second string pattern.

At operation 114, the user inputs one or more computerized files to be automatically scanned for instances of the first string pattern. For example, the user can input a specific file, a group of files, directories, or sub-directories to be scanned. In one embodiment, no entry of specified files results in a default scan of the current directory.

At operation 116, each of the one or more computerized files is automatically scanned for instances of the first string pattern until a file is found containing an instance of the first string pattern, or until all specified files have been scanned.

In one embodiment, the scanning process is automatically performed one file at a time according to the hierarchical structure of the file system and the specified files to be scanned. For example, in a hierarchical directory file structure, files in the uppermost tier of a specified group of files are scanned first, and then directories on that tier. In a recursive search of files in a directory, files in the uppermost tier of a specified group of files are scanned first, and then directories on that tier, and then files in each of the sub-directories. In scanning files having a particular file extension, the directory structure is scanned for files having the specified file extension according to the hierarchical structure. It can, however, be appreciated by those of skill in the art that other scanning patterns can be utilized in implementing the invention.

When a file is found that contains an instance of the first string pattern, at operation 118, each instance of the first string pattern in that file is automatically replaced with the substitute, second string pattern. In the case where an empty string was input as the second string pattern, the first string pattern is simply deleted.

At operation 120, an annotation of the nature of the changes made to the computerized file is automatically created. In one embodiment, a version of the file can be created before and after the replacement of the first string pattern with the second string pattern utilizing a version control system, and an annotation of the nature of the changes automatically made utilizing the version control system.

In one embodiment, operations 116 through 120 are then automatically repeated on the remaining files according to the scan pattern. If no file is found to contain an instance of the first string pattern, method 100 ends.

In some instances, a file can be currently checked out to another user under a version control system. To facilitate editing of the text files in a timely manner, another embodiment of the present invention breaks the version control system lock on the currently checked out file to allow editing of the text file.

Figure 2A:
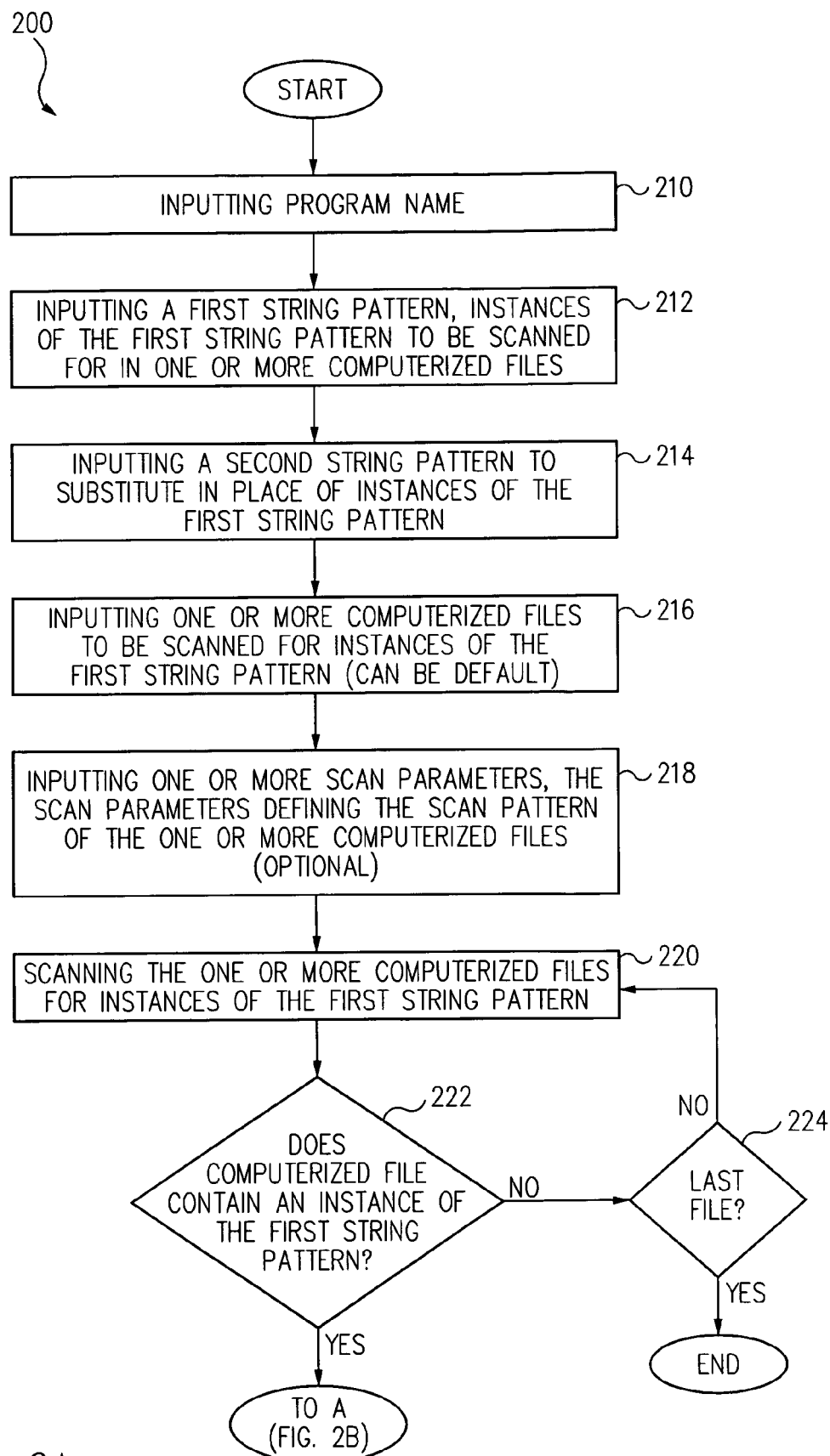
FIGS. 2A and 2B illustrate a method for automatically replacing a first pattern string in one or more computerized files with a substitute, second string pattern with automatic annotation of the nature of the changes made according to one embodiment of the present invention.
Figure 2B:
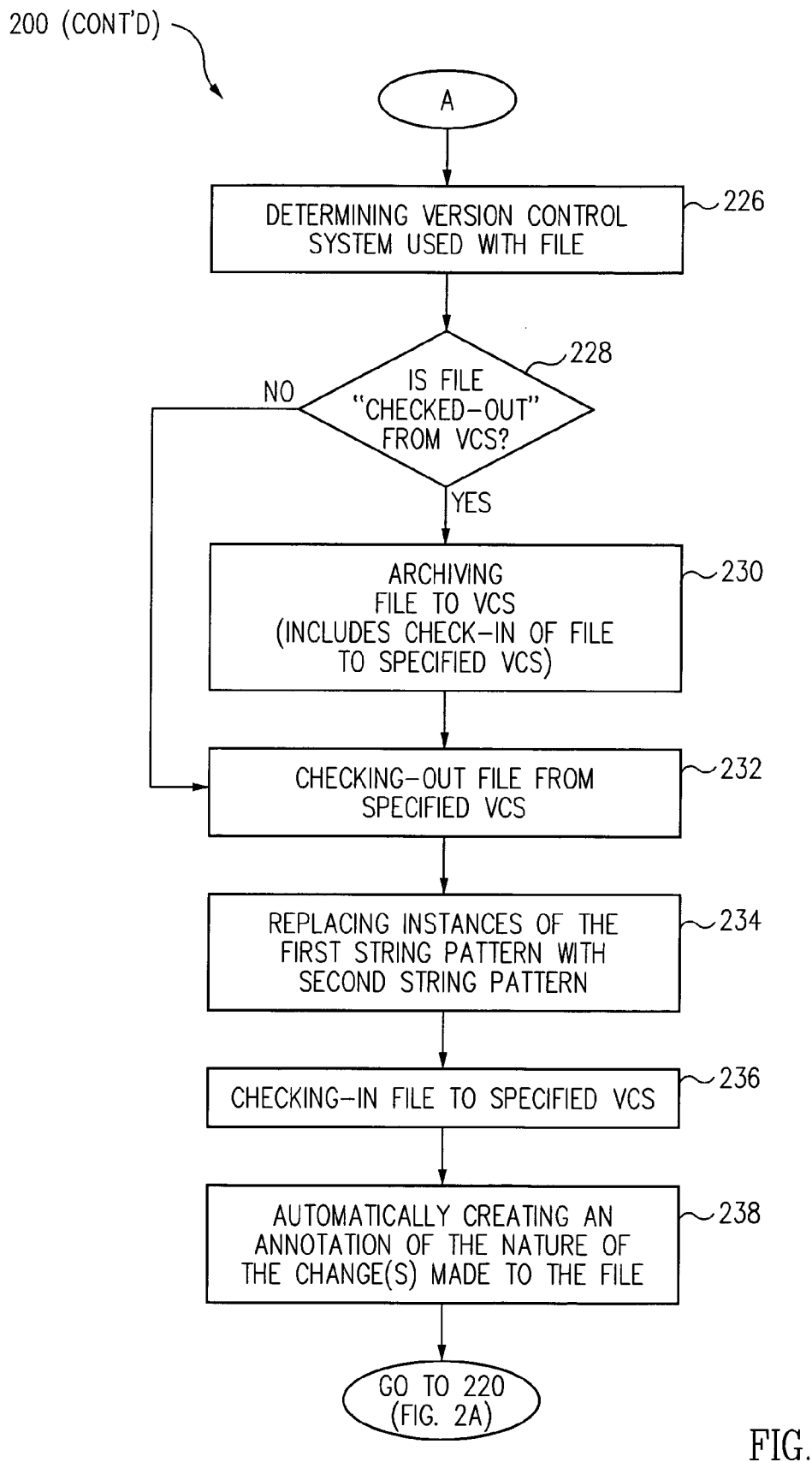

FIGS. 2A and 2B illustrate a method for automatically replacing a first pattern string in one or more computerized files with a substitute, second string pattern with automatic annotation of the nature of the changes made according to one embodiment of the present invention. As earlier described with reference to FIG. 1, herein incorporated by reference, inputting an empty string for the second string pattern effects deletion of the first string pattern.

According to method 200, at operation 210, the user inputs the program name used to invoke, or call, method 200. In one embodiment, the present invention is implemented in PERL script programming language as program name "coAndReplace". Program modifiers are then further appended to the program name to implement the method 200 as further described herein. Together with the program name, program modifiers, such as a first string pattern to be scanned for, a second string pattern to substitute in place of instances of the first string pattern, a specified file or group of text files to be scanned (can be by default), and scan parameters (optional) are also entered. While these modifiers are separately discussed below, in the present embodiment, they can be implemented together with the program name as further described herein.

For example, the user can input the following program name and modifiers:

EXAMPLE 1

$coAndReplace [-r] [-e file_extension] oldPattern newPattern file [file.], if files are specified, or

EXAMPLE 2

$coAndReplace [-r] [-e file_extension] oldPattern newPattern dir [dir . . . ], if directories are specified,
where
oldPattern is a PERL regex string;
newPattern is a PERL regex string;
-e file_extension applies to files which end with the specified file extension; if this option is not used, all files are scanned;
-r checks out and replaces the first string pattern with the second string pattern recursively for files in all subdirectories.

Regex is a PERL command that permits a flexible description of string patterns to be searched/scanned for in files. The regex PERL command is well known to those of skill in the art and, therefore, not further described herein to avoid detracting from the invention.

Thus, at operation 212, the user inputs a first string pattern to be scanned for in one or more text files. In Examples 1 and 2, the first string pattern is termed "oldPattern". Inputting the first string pattern as a regex string pattern permits the user flexibility in defining instances of the first string pattern to be scanned for in the specified computerized files. If a pattern contains double quotes, it is surrounded with single quotes.

At operation 214, the user inputs a second string pattern to substitute in place of instances of the first string pattern. In Examples 1 and 2, the second string pattern is termed "newPattern". The second string pattern defines a specific substitute string, rather than a set of instances. Inputting an empty string as the second string pattern effects deletion of instances of the first string pattern.

At operation 216, the user inputs one or more computerized files to be scanned for instances of the first string pattern. For example, the user can input a specific file, a group of files, directories, or sub-directories to be scanned. For example, in Examples 1 and 2, the user can input the "-e" modifier to specify files with a particular extension, such as files with an html extension. In one embodiment, no entry of specified files, results in a default scan of the current directory.

Optionally, at operation 218, the user can input scan parameters to further define the scanning pattern of the text files. For example, in Example 1, the user can input the "-r" modifier to specify a recursive search of the subdirectories.

At operation 220, the text files are automatically scanned, according to the designated files and scanning parameters, to determine if a text file contains one or more instances of the first string pattern. In one embodiment, the scanning process is performed as earlier described with reference to FIG. 1 and method 100 herein incorporated by reference. It can, however, be appreciated by those of skill in the art that other scanning patterns can be utilized in implementing the invention.

At operation 222, a determination is made whether a text file contains an instance of the first string pattern.

If a file does not contain an instance of the first string pattern, at operation 224, it is determined if the file is the last file to scan in the scan pattern. If it the last file, scanning of the files is complete and method 200 ends. If it is not the last file, method 200 automatically returns to operation 220 to scan the next file in the remaining files in the scan pattern.

If a file contains an instance of the first string pattern, at operation 226, the version control system used, or associated, with the file is determined. For example, if some of the text files are maintained under one version control system, such as the Source Code Control System (SCCS), and other files are under a different version control system, such as the Revision Control System (RCS), operation 226 determines which of the version control systems is used with the particular file containing an instance of the first string pattern. SCCS and RCS are version control systems well known to those of skill in the art and openly available and are therefore not further discussed herein to avoid detracting from the description of the present invention.

At operation 228, it is determined whether the file is currently checked-out from a version control system. If a text file is currently checked-out from a version control system, the text file will typically have a lock placed on the source file by the associated version control system, so that only the user that has checked-out the file can make changes to the file. Another user attempting to edit the file cannot change the source file until the lock is removed.

If the file is not checked out, e.g., a lock is not in place on the file, and method 200 proceeds to operation 232.

If the file is currently checked-out from a version control system, at operation 230, the file is archived by checking-in the file to a specified version control system. In operation 230, the associated version control system lock is automatically broken on the file. The contents of the file prior to breaking lock are saved in the associated version control system and the file is automatically checked-into a specified version control system selected for annotating changes later made to the file according to the present invention. One example of the archiving process is further described herein with reference to FIG. 3. In the present example, RCS is the specified version control system utilized for maintaining annotation of changes made to the files using the present invention. If the file was checked-out under RCS, the current contents of the file will be checked back in to RCS. If the file was checked-out under SCCS, the current contents of the file will be checked in to RCS.

At operation 232, the file is automatically checked-out from the specified version control system, in the present example, RCS. This locks the file and enables changes made to the file to be annotated in the specified version control system upon check-in.

At operation 234, each instance of the first string pattern in the file is automatically replaced with the second string pattern.

At operation 236, following the changes, the text file is automatically checked-in to the specified version control system and the lock on the text file removed.

At operation 238, an annotation of the nature of the changes made to the file is automatically created utilizing the version control system, and the method returns to operation 220 (FIG. 2A) to allow each of the remaining files in the scan pattern to be automatically scanned and edited as needed.

In the present invention, archiving of a checked-out file into the specified version control system includes breaking of associated version control system lock on the file. Lock breaking is dependent upon the version control system utilized with the file. Some version control systems can require a few steps to break an existing lock on a file while others may require a more complex set of steps.

Figure 3:
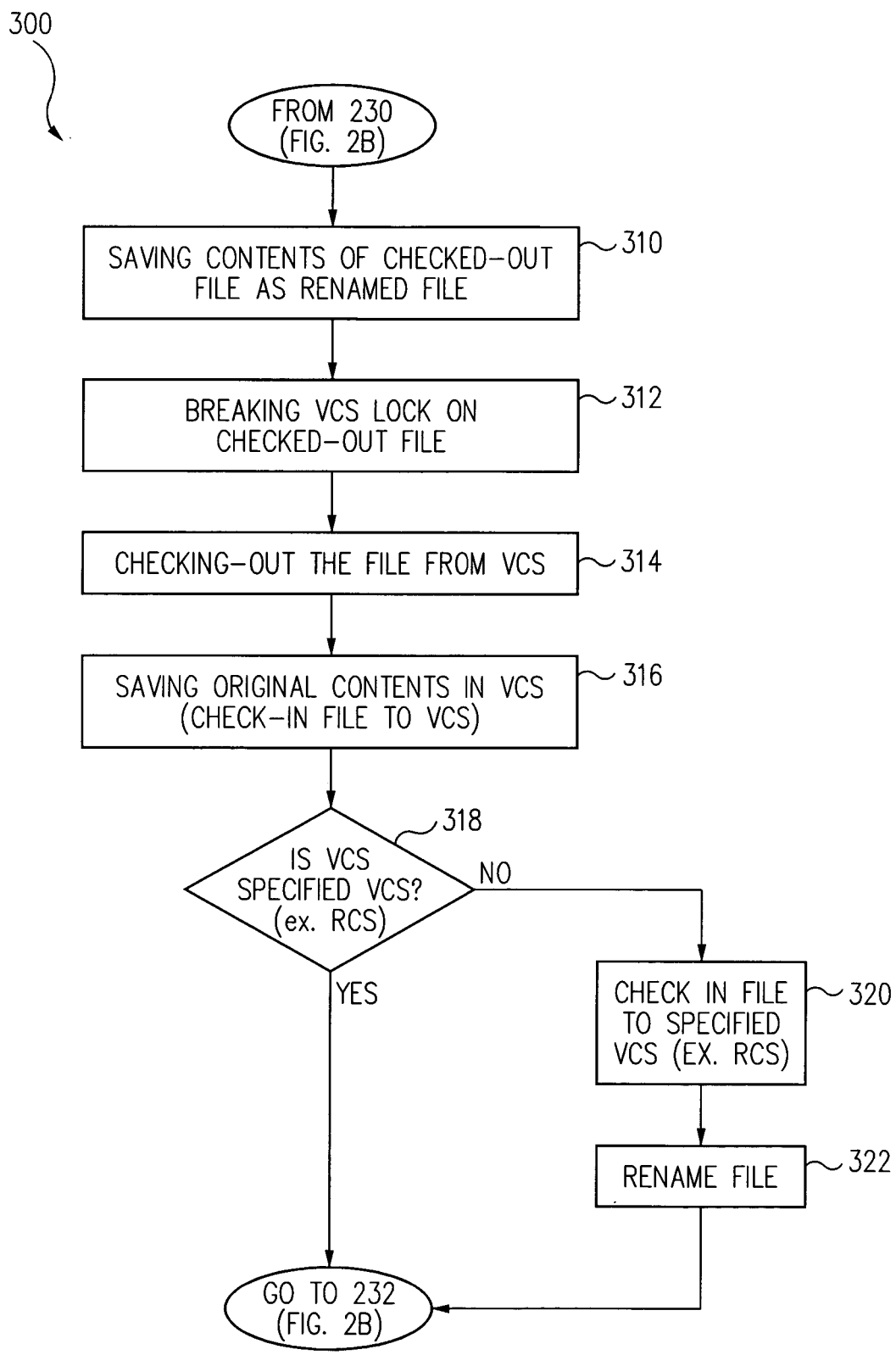
FIG. 3 illustrates a method for archiving a file according to one embodiment of the present invention.

FIG. 3 illustrates a method for archiving a file according to one embodiment of the present invention. The present embodiment is described herein for exemplary purposes as implemented in a system that includes text files associated with RCS or SCCS version control systems. In the present embodiment, non-RCS text files are checked into an RCS version control system prior to editing of the file. It can be appreciated by those of skill in the art that although the present embodiment is described utilizing an RCS and/or SCCS version control system, the principles of the method are applicable to other version control systems as well.

According to method 300, at operation 310, the original contents of the checked-out file are automatically saved as a renamed file, such as in a memory structure of an implementing device, for example, in general RAM disk space of a computer system, or other suitable memory structure.

At operation 312, the version control system lock is automatically broken on the file. Breaking of a version control system lock on a file is version control system dependent and is known to those of skill in the art and is not further described herein. For example, it is known to those of skill in the art that the command "rcs-u filename" can be used to break the lock on an RCS file. Perl for System Administration, Appendix A. The Five-Minute RCS Tutorial, at http://sseti.udg.es/marga/books/47%20O'Reilly%20Books %20(TCP-IP,%20Unix,%20Web,%20Perl,%20Java,%20Oracle) %20by%20wibskey/books/perl2/sysadmin/appa_01.htm) describes use of "rcs-u filename" to break the lock on an RCS file and is hereby incorporated by reference to demonstrate the knowledge of someone of skill in the art. Continuing the example of method 200, if the checked-out text file was associated with the SCCS version control system, the SCCS lock on the checked-out text file is automatically broken.

At operation 314, the text file is checked-out from the associated version control system. For example, the text file is checked out from the SCCS version control system.

At operation 316, the original contents of the checked-out text file from operation 310 is saved in the associated version control system. For example, the original contents of the checked out file that was saved as the renamed file in operation 310 is saved into the SCCS version control system. This allows any changes made to the text file during the session in which the lock was broken to be retained and effectively checks-in the file to the associated version control system.

At operation 318, it is determined if the version control system utilized with the file is a specified version control system. In the present example, the RCS version control system is the specified version control system used to automatically annotate the nature of the changes made to a text file according to the present invention. Thus it is determined whether the version control system associated with the text file is the specified RCS version control system or not. Determination of the version control system can be implemented in a variety of ways, such as by scanning the file name for a ".rcs" extension.

If the version control system associated with the file is the same as the specified version control system, e.g., RCS, the method proceeds to operation 232 (FIG. 2B) as the file was effectively checked-in during operation 316. If the version control system associated with the file is not the specified version control system, for example, is not RCS, but rather it is an SCCS or other non-RCS version control system, at operation 320, the file is checked-in to the specified version control system. For example, if the version control system originally associated with the file was SCCS, and not RCS, the file is checked-in to the RCS version control system and renamed, at operation 322, in preparation for check-out prior to editing at operation 232 (FIG. 2B). This establishes an initial archive copy of the file in the specified version control system, e.g., in the present example, RCS.

Thus by automatically archiving a text file in this way, control is gained over the checked out text file when needed by breaking the version control system lock on the file, and changes made to the text file during the session in which the version control lock was broken are preserved. Further an archive copy of the file is established in the specified version control system prior to replacement of the first string pattern with the second string pattern. This permits automatic annotation of the changes made to the file utilizing the specified version control system.

An example of one embodiment of the present invention is included in this specification as a Computer Program Listing Appendix on compact disc filed herewith, in duplicate as Copy 1 and Copy 2, hereby incorporated by reference. Copy 1 and Copy 2 both include the file "coAndReplace_ansi.txt", 7,215 bytes, created on Oct. 11, 2002. The machine format is IBM PC or compatible, the operating system compatibility is MS-Windows. The example is programmed in PERL (version 5) for implementation on computer systems utilizing Solaris 2.6 and above operating systems. Version control systems utilized with some of the files are RCS (version 5.0) and SCCS (version 1.2). RCS (version 5.0) is utilized as the specified version control system for automatic annotation of the changes made to the files using the present invention. The present embodiment is but one example of one embodiment of the present invention, and is presented to further illustrate the present invention, not to limit the application of the present invention.

Thus, the above embodiments of the present invention enable one or more text files to be automatically scanned for one or more instances of a first string pattern. When one or more instances of the first string pattern are found in a file, the first string pattern is automatically replaced with a second string pattern, and an annotation of the nature of the changes made to the file automatically created utilizing a version control system. Where an empty string is input as the second string pattern, instances of the first string pattern are automatically deleted.

If a file is currently checked-out from a version control system, the present invention will automatically break the version control lock, preserve a copy of the original contents, and automatically check-in the file to a specified version control system to create an archive copy. The file is then checked-out from the specified version control system to permit automatic replacement of one or more instances of the first string pattern in the file with a second string pattern, and annotation of the nature of the changes made to the file automatically created utilizing the specified version control system.

The present invention reduces the time needed to effect edits of multiple text files and is less vulnerable to error than the prior art methods as designated files are automatically scanned for instances of the first string pattern, instances of the first string pattern are automatically replaced with a second string pattern, and annotations of the nature of the changes made to the edited files are automatically made utilizing a version control system.

Any, all, or a portion of methods 100, 200, and 300 can be embodied as a computer program product comprising a medium configured to store or transport computer-readable instructions, such as program code, for methods 100, 200, and 300, or in which computer-readable instructions for methods 100, 200, and 300 are stored. Some examples of computer program products are CD-ROM discs, ROM cards, CD-RW discs, floppy discs, magnetic tapes, computer hard drives, peripheral hard drives, removable memories, memory chips, servers on a network and signals transmitted over a network representing computer-readable instructions.

The foregoing descriptions of implementations of the present invention have been presented for purposes of illustration and description, and therefore are not exhaustive and do not limit the invention to the precise forms disclosed. Modifications and variations are possible in light of the above teachings or can be acquired from practicing the invention. In particular it can be appreciated by those of skill in the art that while the present invention is described with reference to UNIX, PERL script programming language, and the use of particular version control systems, such as RCS and SCCS, the principles are applicable to other operating systems, programming languages and version control systems. Consequently, the scope of the invention is defined by the claims and their equivalents.

We claim:

1. A method for editing computerized files, the method comprising:
    inputting a first string pattern, one or more instances of the first string pattern to be scanned for in one or more computerized files;
    inputting a second string pattern to be substituted in place of the one or more instances of the first string pattern;
    inputting one or more computerized files to be scanned for the one or more instances of the first string pattern, wherein the one or more computerized files to be scanned for one or more instances of the first string pattern are specified by the file extension of the files;
    scanning the one or more computerized files for the one or more instances of the first string pattern;
    replacing each of the one or more instances of the first string pattern in the one or more computerized files with the second string pattern; and
    automatically creating an audit annotation of the nature of the replacements made to the computerized files.

2. The method of claim 1, wherein the first string pattern defines a specific instance.

3. The method of claim 1, wherein the first string pattern defines a set of instances.

4. The method of claim 1, wherein the second string pattern defines a specific instance.

5. The method of claim 1, wherein the second string pattern is an empty string, and further wherein replacing the first string pattern with the second string pattern deletes the first string pattern.

6. The method of claim 1, wherein the one or more computerized files are scanned recursively.

7. The method of claim 1, wherein the one or more computerized files are text files.

8. The method of claim 1, wherein the automatic annotation of the nature of the replacements made to the computerized files is automatically made utilizing a version control system.

9. A method for editing computerized files, the method comprising:
    inputting a first string pattern, one or more instances of the first string pattern to be scanned for in one or more computerized files;

inputting a second string pattern to be substituted in place of the one or more instances of the first string pattern;

inputting one or more computerized files to be scanned for instances of the first string pattern;

scanning the one or more computerized files for one or more instances of the first string pattern;

determining if a computerized file contains one or more instances of the first string pattern;

if a computerized file does not contain one or more instances of the first string pattern, determining if the computerized file is the last file to be scanned;

if the computerized file is not the last file to be scanned, returning to scanning the remaining one or more computerized files for one or more instances of the first string pattern;

if the computerized file is the last file to be scanned, the scanning of the files is complete, and ending the method;

if the computerized file does contain one or more instances of the first string pattern, determining what version control system is utilized with the computerized file;

determining if the computerized file is checked-out from the version control system;

if the computerized file is checked-out from the version control system, archiving the computerized file by checking-in the computerized file to the version control system;

if the computerized file is not checked-out from the version control system, checking-out the computerized file from the version control system;

replacing one or more instances of the first string pattern in the computerized file with the second string pattern;

checking in the computerized file including the replacements to the version control system;

automatically annotating the nature of the changes made to the computerized file in the version control system; and returning to scanning the remaining one or more computerized files for one or more instances of the first string pattern.

10. The method of claim 9, further comprising:
inputting one or more scan parameters, the scan parameters further defining the scan pattern of the one or more computerized files.

11. The method of claim 10, wherein the scan parameter defines a recursive scan pattern.

12. The method of claim 9, further comprising:
inputting the program name.

13. The method of claim 9, wherein the method is programmed in PERL script programming language.

14. The method of claim 9, wherein the computerized files are text files.

15. The method of claim 9, wherein archiving the computerized file further comprises:

saving a copy of the original contents of the computerized file as a renamed file;

breaking the version control system lock on the computerized file;

checking-out the computerized file from the version control system;

saving the original contents in the version control system;

determining if the version control system associated with the computerized file is a specified version control system;

if the version control system is a specified version control system, returning to checking out the computerized file from the version control system; and if the version control system is not the specified version control system, checking in the computerized file using the specified version control system and renaming the file.

16. The method of claim 15, wherein the specified version control system is RCS.

17. A computer program product having stored thereon computer readable instructions wherein execution of the computer readable instructions generates a method for editing computerized files, the method comprising:

inputting a first string pattern, one or more instances of the first string pattern to be scanned for in one or more computerized, files;

inputting a second string pattern to be substituted in place of the one or more instances of the first string pattern;

inputting one or more computerized files to be scanned for the one or more instances of the first string pattern, wherein the one or more computerized files to be scanned for one or more instances of the first string pattern are specified by the file extension of the files;

scanning the one or more computerized files for the one or more instances of the first string pattern;

replacing each of the one or more instances of the first string pattern in the one or more computerized files with the second string pattern; and automatically creating an audit annotation of the nature of the replacements made to the computerized files.

18. A computer program product having stored thereon computer readable instructions wherein execution of the computer readable instructions generates a method for editing computerized files, the method comprising:

inputting a first string pattern, one or more instances of the first string pattern to be scanned for in one or more computerized files;

inputting a second string pattern to be substituted in place of the one or more instances of the first string pattern;

inputting one or more computerized files to be scanned for instances of the first string pattern;

scanning the one or more computerized files for one or more instances of the first string pattern;

determining if a computerized file contains one or more instances of the first string pattern;

if a computerized file does not contain one or more instances of the first string pattern, determining if the computerized file is the last file to be scanned;

if the computerized file is not the last file to be scanned, returning to scanning the remaining one or more computerized files for one or more instances of the first string pattern;

if the computerized file is the last file to be scanned, the scanning of the files is complete, and ending the method;

if the computerized file does contain one or more instances of the first string pattern, determining what version control system is utilized with the computerized file;

determining if the computerized file is checked-out from the version control system;

if the computerized file is checked-out from the version control system, archiving the computerized file by checking-in the computerized file to the version control system;

if the computerized file is not checked-out from the version control system, checking-out the computerized file from the version control system;

replacing one or more instances of the first string pattern in the computerized file with the second string pattern;

checking in the computerized file including the replacements to the version control system;

automatically annotating the nature of the changes made to the computerized file in the version control system; and returning to scanning the remaining one or more computerized files for one or more instances of the first string pattern.

19. The computer program product of claim 18, wherein if the file is checked-out from the version control system, archiving the file further comprises:

saving a copy of the original contents of the computerized file as a renamed file;

breaking the version control system lock on the computerized file;

checking-out the computerized file from the version control system;

saving the original contents in the version control system;

determining if the version control system associated with the computerized file is a specified version control system;

if the version control system is a specified version control system, returning to checking out the computerized file from the version control system; and if the version control system is not the specified version control system, checking in the computerized file using the specified version control system and renaming the file.

* * * * *

UNITED STATES PATENT AND TRADEMARK OFFICE
CERTIFICATE OF CORRECTION

| | | |
|---|---|---|
| PATENT NO. | : 7,099,902 B2 | Page 1 of 1 |
| APPLICATION NO. | : 10/318880 | |
| DATED | : August 29, 2006 | |
| INVENTOR(S) | : Tran et al. | |

It is certified that error appears in the above-identified patent and that said Letters Patent is hereby corrected as shown below:

Column 12
In Claim 17, at line 16, after "computerized", delete ",".

Signed and Sealed this

Fifth Day of December, 2006

JON W. DUDAS
*Director of the United States Patent and Trademark Office*